United States Patent [19]

Sunol

[11] Patent Number: 4,992,308
[45] Date of Patent: Feb. 12, 1991

[54] SUPERCRITICAL FLUID-AIDED TREATMENT OF POROUS MATERIALS

[75] Inventor: Aydin K. Sunol, Port Richey, Fla.

[73] Assignee: University of South Florida, Tampa, Fla.

[21] Appl. No.: 245,858

[22] Filed: Sep. 16, 1988

[51] Int. Cl.⁵ .............................................. B05D 3/00
[52] U.S. Cl. .................................... 427/297; 427/394;
427/395; 427/396; 427/397; 427/324; 427/325;
427/308; 162/72
[58] Field of Search ............... 427/297, 394, 395, 396,
427/397, 308, 317, 324, 328; 162/72

[56] References Cited

U.S. PATENT DOCUMENTS

| | | | |
|---|---|---|---|
| 3,790,401 | 2/1974 | Maine | 427/297 |
| 4,308,200 | 12/1981 | Fremont | 260/110 |
| 4,500,568 | 2/1985 | Pearson | 427/247 |
| 4,644,060 | 2/1987 | Chou | 426/69 |

*Primary Examiner*—Stanley Silverman
*Attorney, Agent, or Firm*—Joseph C. Mason, Jr.

[57] ABSTRACT

Method and process using a supercritical fluid, with or without the aid of entrainers (1) to solubilize a monomer, monomer mixture or polymer which may or may not include additives and entrainers, (2) to carry the supercritical solvent mixture thereby created into the wood matrix, (3) to remove extractives from the wood, (4) to precipitate the monomer or polymer within the wood, and (5) to polymerize the monomer in situ in the wood.

7 Claims, 7 Drawing Sheets

SUPERCRITICAL FLUID-AIDED TREATMENT OF POROUS MATERIALS

TECHNICAL FIELD

This invention relates, generally, to methods of improving the mechanical and chemical properties of porous materials. More particularly, it relates to a process for impregnating hard or soft woods with monomers or polymers using a supercritical fluid.

BACKGROUND ART

Certain mechanical properties of wood, such as hardness, bending strength, compression properties and the like, may be improved by impregnating the wood with monomers or polymers. Whether the wood is impregnated with monomers, polymers, or a combination of both, the resulting wood is usually referred to as a wood-composite.

A well known process for producing a wood-composite involves immersing the wood to be treated in a fluid such as water, having dissolved therein a monomer or polymer, and subjecting the fluid to positive pressure to drive the monomer or polymer into the wood. This process is time consuming; large articles of wood require higher pressures and longer periods of time to complete the impregnating process vis a vis small articles of wood.

Variations of the known process include the use of negative pressure as well, or combinations of positive and negative pressures. Since impregnation by flow of monomer or polymer through the axial direction is the dominant mechanism, a major drawback of these known wood impregnation processes is that they are slow and result in non-uniform impregnation due to impenetrable pores. It is also known to impregnate wood with, say, methyl methacrylate (MMA) and to polymerize the MMA within the wood. One method for polymerizing polymerizable material in wood used high energy radiation, for example, electron beam or gamma rays. This method requires a relatively high dosage of absorbed radiation which is costly. The prior art has also shown that lumber and wood veneers can be impregnated with plastic materials to improve and protect the surface of the wood. Furthermore, wood particles can be coated with plastic and compressed into various shapes.

This prior art knowledge is not limited to combinations of wood and polymer. For example, polymer impregnated paper, known as papreg and its laminates have been used in a wide range of applications. Similarly, impreg, a polymer impregnated laminated wood has been used for handles of utensils. If compressed, this impregnated laminate is referred to as compreg. There is also flapreg which is a polymer impregnated flakeboard and staypak, a polymer impregnated compressed, heat stabilized laminated veneer, which have found commercial uses.

Each of the prior art polymer impregnated wood and biomasses have been cumbersome, relatively expresive, and time consuming to produce.

Examples of prior art treatments for wood and other porous materials are shown in the following patents and publications:

| | | | |
|---|---|---|---|
| 2,064,965 | 3,726,709 | 4,376,693 | EP 1540 |
| 2,740,728 | 3,790,401 | 4,388,171 | JA 135004 |
| 3,029,159 | 3,968,276 | 4,500,568 | EP 45828 |
| 3,160,515 | 4,008,342 | 4,554,185 | JA 1102206 |
| 3,183,114 | 4,167,597 | 4,576,838 | JA 101311 |
| 3,200,003 | 4,308,200 | 4,596,724 | |
| 3,579,369 | 4,313,976 | Agnew 17,701 ('78) | |
| | | Chem. Wk. 14 Oct. '81 | |

DISCLOSURE OF INVENTION

It has now been found that the difficulties observed in the prior art processes for wood impregnation can be overcome by the use of supercritical fluids to assist in the impregnation of monomers or polymers in porous materials.

Supercritical fluid is used in the present inventive process with respect to wood impregnation, with or without the aid of entrainers, (1) to solubilize a monomer or polymer or mixtures thereof which may or may not include additives and entrainers, (2) to carry the supercritical solvent monomer or polymer mixture thereby created into the wood matrix, (3) to remove extractives from the wood, and (4) to precipitate the monomer or polymer within the wood, either sequentially or concurrently. If a monomer or monomer mixture is impregnated into the wood, this invention further teaches the step to polymerize the monomer is situ in the wood.

According to one embodiment of the invention, a process for making a polymer impregnated material which comprises treating a porous material with a supercritical fluid containing polymerizable matter under conditions sufficient to polymerize said monomer in situ in said material is disclosed.

Another embodiment of the invention is a process for making a polymer impregnated material which comprises treating a porous material with a supercritical fluid containing polymer under conditions sufficient to impregnate the polymer into the material.

A further embodiment of the invention is a process for treating wood which comprises contacting wood with a supercritical fluid under supercritical conditions sufficient to extract extractives and lignin from the wood.

A still further embodiment of the invention is a process for making paper which comprises impregnating wood with an alkaline medium or acid medium in the presence of a first fluid maintained under supercritical conditions, digesting the medium impregnated wood in the presence of a second fluid maintained under second supercritical conditions including conditions sufficient to extract extractives and lignin from the wood and to separate the wood into essentially discrete fibers, separating supercritical fluid and extractives from the digested wood, and treating the separated digested wood under conditions sufficient to convert the digested wood to paper. Another further embodiment of the paper making embodiment is the treating of the separated digested wood under conditions including contacting the digested wood with a third supercritical fluid containing monomer, precipitating the monomer within the wood, and polymerizing the monomer in situ in the digested wood.

Another embodiment of the invention is a process comprising mixing a supercritical fluid with polymerizable monomer and monomer polymerization catalyst to form a supercritical wood impregnating medium; contacting wood with the medium in an impregnation zone under conditions sufficient to impregnate the wood with the monomer and to polymerize the monomer in situ in the wood; and removing polymer impregnated wood from the impregnation zone.

According to another embodiment of the invention a process of making a cellulose containing material having enhanced properties comprises impregnating a cellulose containing starting material with a polymerizable monomer in the presence of a fluid under supercritical conditions and causing the monomer to polymerize in situ in the cellulose containing material, thereby imparting enhanced properties to the starting material.

According to a further embodiment of the invention a process of making a cellulose containing material having enhanced properties comprises contacting cellulose containing material with a first supercritical solvent under conditions sufficient to extract extractives from the cellulose containing material; separating supercritical solvent containing the extractives from the cellulose containing material having less extractives; contacting the cellulose containing material having less extractives with a second supercritical fluid containing a polymerizable monomer under conditions sufficient to impregnate the monomer into the cellulose material having less extractives; precipitating the polymerizable monomer within the cellulose containing material having less extractives; and polymerizing the precipitated monomer in situ with the cellulose containing material having less extractives, thereby making a cellulose containing material having enhanced properties.

A still further embodiment of the invention is a process for treating wood to improve its physical properties comprising subjecting the wood to negative pressure to remove moisture and air therefrom; immersing the wood for a predetermined time in a supercritical solvent containing monomer; enlarging the pores of the wood by subjecting the wood to an entrainer dissolved in the supercritical fluid; promoting polymerization of the monomer by dissolving a polymerization catalyst in the supercritical solvent; inhibiting premature polymerization of the monomer by including a polymerization inhibitor in the supercritical solvent; facilitating the transport of monomer from bulk in the cell walls of the wood by dissolving an additional solvent in the supercritical solvent; subjecting the immersed wood to conditions sufficient to polymerize the monomer within the cells of the wood; and separating the wood containing polymers from the supercritical fluid, thereby making a wood having improved physical properties.

Suitable supercritical fluids include carbon dioxide, the lower alkenes such as ethylene, the lower alkanes such as ethane, nitrous oxide, ammonia and other low viscosity compounds with critical temperatures in the range of 5-250 degrees centigrade. Aqueous solutions of certain supercritical fluids, such as ammonia, are acceptable in the practice of this invention. The supercritical fluid in many applications acts as a solvent. Solvent power can be related to the solvent density when operating in the critical region. In the critical region both pressure and temperature can now be used to regulate the density and therefore the solvent power of the supercritical fluid. Supercritical fluids possess liquidlike density and exhibit gaslike transport properties of diffusivity and viscosity. The zero surface tension of supercritical fluids allows facile penetration into microporous materials, such as wood.

The properties of gaslike diffusivity and viscosity, zero surface tension and liquidlike density, combined with the pressure and temperature dependent solvent power, make supercritical fluids useful in the practice of this invention. The solvent characteristics of the fluid can be easily adapted by changing the fluid density. The fluid density is adjusted by varying the pressure or the temperature. In a practical application, the same supercritical fluid can be a specific solvent for a given material of a nonsolvent for that material by manipulating the density of the supercritical fluid.

Examples of supercritical fluids useful in the practice of this invention include:

| Fluid (Solvent) | Critical Temperature °C. | Critical Pressure atm (psia) |
|---|---|---|
| Methykl Amine | 156.9 | 73.6 (1,081.92) |
| Chlorotrifluoromethane | 28.9 | 38.7 (568.74) |
| Trichlorofluoromethane | 198.1 | 43.5 (639.28) |
| Ammonia | 132.5 | 111.3 (1,635.66) |
| Ethane | 32.3 | 48.2 (708.35) |
| Ethylene | 9.3 | 49.7 (730.39) |
| Propane | 96.7 | 41.9 (615.76) |
| Propylene | 91.9 | 45.6 (670.14) |
| Carbon Dioxide | 31.1 | 72.8 (1,070.16) |
| Sulfur Dioxide | 157.2 | 77.7 (1,142.19) |
| Ethanol | 243.1 | 63.1 (927.51) |
| Methanol | 240.0 | 78.7 (1,156.89) |

$CO_2$ is the preferable fluid since its critical temperature is 31.1° C. and that makes it an ideal solvent for use in this invention. $CO_2$ is non-toxic, non-flammable, environmentally acceptable, and relatively inexpensive. Its viscosity traits are particularly attractive for use in this invention. For example, in the pressure range between 72.8 atms (1,070 p.s.i.a.) and 700 atms (10,290 p.s.i.a.), the viscosity of $CO_2$ may be adjusted between about 0.02 to 0.11 centipoises.

Polymerizable monomers that can be used in the practice of the invention include methyl methacrylate, dialkylphthalate, ethyl acrylate, styrene, glycidyl methacrylate, tri-n-butyltin methacrylate, vinyl chloride, arcylonitrile, chlorostyrene, t-butyl styrene, vinyl monomers such as vinyl acetate and vinyl propinate, ethylen glycol, ethylene oxide, butadiene, isoprene, and their combinations. Monomers also include low polymers of resins such as the polyesters. Each monomer should have relatively low viscosity so that when dissolved in the supercritical fluid the solvent will continue to have relatively low viscosity (less than 1.0 centipoise) in order to permit easy penetration into the wood, e.g., below 4 poises at 25° C. [g/(sec.)(cm)] for practical purposes.

In certain instances the supercritical fluid may also be the monomer. For instance, ethylene may act as the supercritical solvent and may also be polymerized in situ under appropriate conditions, including thermal polymerization.

Polymers useful in the practice of this invention include polypropylene, Nylon-6, and poly-butene-1. Other polymers will include the broad class of polymeric material having appropriate solubility in the selected supercritical fluid, although operating conditions of temperature and pressure must be higher than the condition needed for monomers.

Use in this invention of polymers dissolved or admixed in supercritical fluids is dependent upon the polymer-fluid mixture being in the supercritical range of 5° to 250° C. and a pressure from 400 to 3,500 pounds per square inch absolute. Therefore, utilizing the unique properties of supercritical fluids in a solvent environment permits relatively high molecular weight polymers to be directly impregnated into the matrix of the biomass.

Examples of polymer solubility in carbon dioxide include:

| Polymer | Supercritical Fluid (Solvent) | Pressure atm (psia) | Temperature °C. | Solubility wt. % |
|---|---|---|---|---|
| Polypropylene | $CO_2$ | 450–850 (6,613–12,491) | 163–208 | 6–38 |
| Nylon-6 | $CO_2$ | 400–510 (5,878–7,495) | 233–241 | 13–16 |

Solubility of the monomer or polymer in the supercritical may range from 1% to 50% by weight although the amount soluble is not critical so long as sufficient monomer or polymer is dissolved to impart the desired characteristics to the impregnated wood. One of the unique features of a supercritical fluid is that it can show a wide range of solvent characteristics. Methods of determining appropriate solubility data for a polymer or monomer in a supercritical fluid is demonstrated in FIG. 1, more fully discussed hereinafter.

Suitable entrainers include acetone, ethanol, methanol, benzene, toluene, dioxane and dimethyl sulfoxide.

Entrainers (1) promote swelling of the porous wood matrix, (2) enhance the solubility of the monomer or monomer mixture and the additives, (3) enhance the selectivity of the monomers or monomer mixture, and (4) enhance the solubility of the extractives, resins, and waxes that are extracted from the wood. Less desirable homopolymer formation between the wood fibers occurs where in situ polymerization occurs in the absence of swelling; accordingly, the use of an entrainer is preferable.

The cellulose containing material may be wood or paper or other bio-mass materials, and the wood may be wood chips, laminates, plates, veneer, other wood components and logs (roundwood). Paper includes paperboard. Porous materials include cellulose containing material and leather including artificial leathers and non-woven cloth as well as tile, cement (concrete) and bricks.

Wood is cellular and known to have the major components of cellulose, hemicellulose, lignin i.e. phenolics and extractives which includes resin, gum ducts, and pectins. It is a natural composite consisting mainly of fibers interconnected by a predominantly lignin binder. It is the lignin present in the middle lamella of wood and other cellulose materials that acts as a seal surrounding the cellulose fibers and shields or blocks access to the cellulose, e.g., enzymatic and microbial access. For commercial reasons, and with particular references to making paper, the wood fiber including cellulose is generally separated from those other constituents in a digesting process, or pulping process. These are generally chemical processes and are known as the soda, the kraft, and the sulfite processes.

The prior art digestion or pulping of wood is carried out, typically, at a temperature of about 170° C. for a predetermined time, typically, 1 to 2 hours at super atmospheric pressure of, say, 150 psia. During this process, extractives may also be removed by aqueous solutions or organic solvents. The critical step in digestion is to get the acid or alkaline medium into the wood fibers so that lignin and hemicellulose are degraded for dissolution and for the extractives to be removed. The pulped wood is subsequently treated under conditions to convert the wood pulp form into paper form. Paper made from the pulp prepared in accordance with this invention will have a quality equal to or greater than paper made from a conventional kraft pulp. In most instances, the same paper-making equipment can be utilized to practice this invention as is used with present paper making processes with suitable modification to handle the supercritical fluid and its recovery and re-use in the process.

In the practice of this invention, the use of supercritical fluids during digestion and extraction and monomer impregnation greatly reduces the time to accomplish the desired result. For instance, monomer impregnation using supercritical fluid may be accomplished in minutes rather than hours or days without the use of such fluids due to mass and heat transfer limitations. Details for use of supercritical fluids during the pulping or digestion process may be found in my co-pending patent application Ser. No. 245,844 filed on even date herewith and said application is incorporated herein by reference.

Extraction as used in this invention is reactive supercritical delignification. The supercritical solvent or its components react under supercritical conditions selectively with the wood to delignify selectively. This selectivity means that faster times, higher yields, higher delignification rates and amount, and acceptable quality pulps can be obtained. For instance, the primary supercritical fluid selectively reacts with the wood, e.g., acidic medium such as sulfur dioxide or alternatively, the primary supercritical fluid does not react with the wood but is the transport medium for the reactive components, e.g., an alkaline medium such as a supercritical ammonia and while liquor, into the wood, whereby reacted chemicals and wood components such as lignin are removed from the wood. The added advantage of the alkaline medium, such as ammonia, is to swell the wood for easier penetration and to buffer the reactions.

The essence of this invention is the impregnation of the porous material with supercritical fluids either to react themselves with the porous material, or to act as a transport medium for selective reactive materials into the porous material. Thus, impregnation using supercritical fluids is the dominate mass transfer phenomenon for extraction, digestion, and monomer or polymer impregnation of such porous materials.

The choice of components for the supercritical fluid mixture is limited only by the principle of this invention that the mixture itself is maintained in a supercritical state. Therefore, mixtures of $CO_2$, monomer, entrainer, and/or other solvents are maintained in a supercritical state during practice of this invention. It is the supercritical state that permits the economics of chemical impregnation and/or reactions within wood, e.g., practice of the kraft process wherein the alkaline materials together with, say, $CO_2$ are maintained under supercritical conditions sufficient to react such materials with the components of the wood.

As used herein supercritical fluids and supercritical conditions means that the fluid selected is at a temperature and pressure above its critical point. Generally, this includes fluids having a critical point of from 5° to 250° C., typically 15° to 175° C., preferably from 25° C. to 100° C., and a pressure from 400 to 3500 pounds per square inch absolute. Its viscosity should be substantially less than the viscosity of water, (e.g., 1.0 centipoise at 25° C. and 1 atm pressure).

Preferably, prior to treatment in accordance with this invention, the porous material, e.g. wood, is preconditioned to remove air and moisture. This is typically accomplished by an air-dry atmospheric pressure method over a period of, say, 2-3 months or by a negative pressure method such as confining the wood in a closed container and applying a vacuum of, say, 22-25, typically, 10-15 mm Hg absolute for a time, e.g. 5 minutes to 30 minutes, sufficient to reduce the air and moisture content of the wood to, typically, 4-15% moisture by weight.

The additives which may be used in the practice of this invention include initiators/catalysts, polymerization inhibitors to inhibit premature polymerization such as hydroquinone, 2,4-dimethyl-6-t-butyl phenol, fire retardants such as organophosphorus esters, and dyes or other components.

Suitable polymerization catalysts include:

Azo compounds, e.g. 2,2-azobis (isobutyronitrile); organic peroxides e.g. benzoyl peroxide; dialkyl peroxides e.g. di-t-butyl peroxide; redox agents, e.g. persulfates plus reducing agents (bisulfate ion), hydroperoxides plus ferrous ion, and silver alkyls, e.g. Ag-$C_2H_5$. Preferably, activators include the tertiary amines such as NN'-dimethylaniline and NN'-dimethyl-p-toleridine. Polymerization initiators include the peroxides such as diacyl peroxides including di-benzoyl peroxide.

Dyes or other components for achieving special effects may also be dissolved into the supercritical fluid. For example, an additional solvent such as dimethyl sulfoxide may be used as an aid for transporting the monomer from bulk into the cell wall of the wood. A small amount of polymerization catalyst, such as benzoyl peroxide, methyl ethyl ketone peroxide, is all that is needed for in situ polymerization of the monomer, although the use of a catalyst is not required. If desired, known thermal and radiation techniques may be used for such polymerization. Organophosphorus esters could be impregnated to be ammoniated to form fire retardants.

In practice, the wood is first treated to remove air and moisture therefrom. Typically, this is accomplished by a vacuum being imposed on the wood starting material contained in a closed vessel.

Next, the extraction, digestion, and impregnation feeds are prepared; the supercritical solvent may or may not be mixed with entrainers and additives to prepare the extraction feed. The impregnation feed includes supercritical fluid and, if desired, the monomer, monomer mixture, or polymer.

The supercritical feed preparation may be accomplished by either mixing, in a batch mode, the selected supercritical fluid with desired entrainers, additives, and/or monomer or polymer at predetermined component ratios that achieve supercritical phase conditions, or by co-current or counter-current stripping of the desired components such as entrainers, additives, and/or monomer or polymer with the selected supercritical solvent. From the teachings herein, those skilled in the art may prepare the supercritical feed by other methods.

The extraction process is performed, followed by the impregnation process. Precipitation of the monomer from the supercritical fluid results from the release of the supercritical fluid. Polymerization of the impregnated monomer is caused to occur in situ in either a post-impregnation step or concurrently with impregnation. In graft polymerization, chemical links are formed between the impregnated polymers and the wood fibers.

The steps of extraction, impregnation, component precipitation, and monomer polymerization may be performed in accordance with this invention sequentially or concurrently, depending upon the desired end result. In most instances, it is preferred that the monomer polymerization, if polymer enhancement of the porous material is the desired result, be performed as the last step in the process.

The steps of the invention as outlined above may be performed in differing sequences, with polymerization usually being the final step. Prior to recovery of the porous material having enhanced properties, the use of a polymer having desired characteristic eliminates the need for further polymerization in these processing steps. For example, the inventive process may be practiced without the extraction step while practicing impregnation, precipitation, and polymerization steps as herein described.

It is the primary object of this invention to advance the art of wood treating by disclosing a method for supercritical fluid-aided impregnation of wood with monomers or polymers. Other objects will be apparent from the description of the invention which follows.

The invention accordingly comprises the features of construction, combination of elements and arrangement of parts that will be exemplified in the descriptions set forth hereinafter and the scope of the invention will be set forth in the claims.

BRIEF DESCRIPTION OF DRAWINGS

For a fuller understanding of the nature and objects of the invention, reference is made to the following detailed description, taken in connection with the accompanying drawings, in which.

Similar reference numerals refer to similar parts throughout the several views of the drawings.

BEST MODES FOR CARRYING OUT THE INVENTION

Exemplary methods of carrying out the invention will now be described. Numerous variations of the inventive process are within the scope of this invention.

The first method includes removing air and moisture from the wood by vacuuming with or without the application of heat, preparing an extraction feed including a supercritical solvent, using the extraction feed to remove extractives from the wood, preparing an impregnation feed including supercritical solvents, using the impregnation feed under supercritical conditions of temperature at pressure to impregnate the wood with a monomer, monomer mixture or polymer, separating the monomer, monomer mixture, or polymer from the supercritical solvent by precipitation as the supercritical solvent is depressured below supercritical conditions, which depressuring decreases the solubility of the monomer, monomer mixture, or polymer thereby causing the precipitation thereof, followed by, for example, in situ graft polymerization, where a chemical link is formed between the impregnated polymers and the wood fibers, thereby providing a wood-composite having superior mechanical and chemical properties compound to untreated wood. Basically, this process includes preparing an extraction feed, performing the extraction, preparing an impregnation feed, performing the impregnation, followed by precipitation and polymerization.

A second process includes removing moisture from the wood, preparing an impregnation feed, performing the extraction and impregnation with the impregnation feed, followed by precipitation and polymerization.

A further exemplary process begins with the preparation of the impregnation feed; the impregnation feed is employed to carry out the extraction and impregnation step as in the second exemplary process, followed by precipitation and polymerization.

Moisture removal followed by preparation of an impregnation feed and extraction and impregnation with the impregnation feed resulting in polymerization is the fourth exemplary process.

The process with the smallest number of steps includes preparation of an impregnation feed, and impregnation with said impregnation feed and polymerization.

The penultimate exemplary process includes moisture removal, preparation of an extraction feed, extraction, preparation of an impregnation feed, impregnation and polymerization.

The final exemplary process includes preparation of an extraction feed, extraction, preparation of an impregnation feed, impregnation and polymerization.

Figure 1:
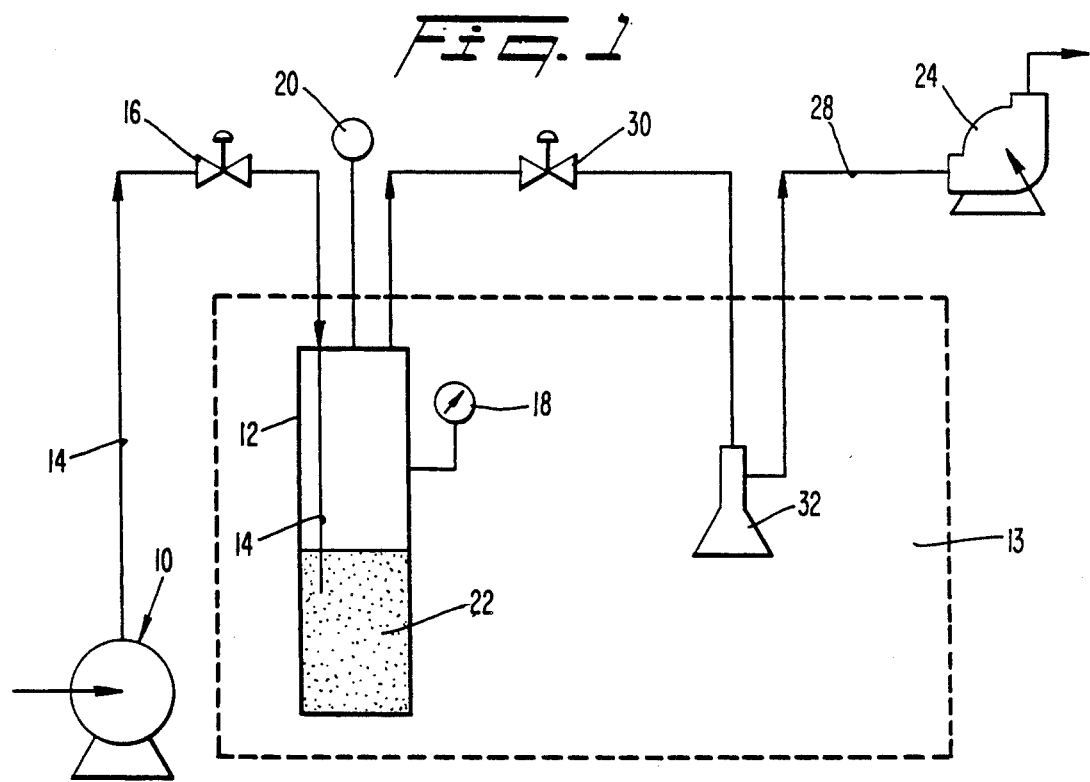
FIG. 1 is a schematic drawing of an exemplary apparatus employed to determine the percentage solubility of a monomer/entrainer/catalyst mixture in a supercritical fluid.

The apparatus shown in FIG. 1 has utility in determining the percent solubility of a monomer in a supercritical fluid. For example, supercritical carbon dioxide supply 10 is in fluid communication with pressure tank 12 in water bath 13 via line 14 and valve 16. The pressure and temperature within tank 12 are measured by gauges 18, 20, respectively.

A solution 22 of entrainer and the monomer being tested is subjected to differing temperatures and pressures as the supercritical fluid is introduced into the solution via line 14 which terminates below the surface of solution 22 as shown. The resulting supercritical solvent containing the dissolved monomer and/or entrainer is passed through line 26, pressure release valve 30, and liquid collector 32. The $CO_2$ as a gas is passed through to a wet test meter 24 for measurement of volume.

Using the apparatus configuration of FIG. 1, at 2000 psig and 35 degrees centigrade, the percent solubility of methyl methacrylate (MMA), a suitable monomer, in carbon dioxide, a suitable supercritical fluid, is about 10.8% by weight. The percentage drops to about 10.3% at 45 degrees centigrade and to 1.9% at 55 degrees centigrade. At 1800 psig and 35 degrees centigrade, the percent solubility of MMA in carbon dioxide is about 7.6%; the percentage increases to about 10.4% at 45 degrees centigrade but drops to 4.7% at 55 degrees centigrade. At 2400 psig, the percentage solubility of MMA in $CO_2$ remains substantially constant at 35 degrees centigrade, 45 degrees centigrade, and 55 degrees centigrade. Specifically, the percentage at these temperatures is, respectively, 5.3%, 5.0% and 5.4%.

The use of carbon dioxide as the supercritical fluid is not critical to this invention, but is preferred for many applications. Any low viscosity compound having a critical temperature between 5-250 degrees centigrade and having the ability to solubilize a desired polymer or monomer would be acceptable.

Figure 2:
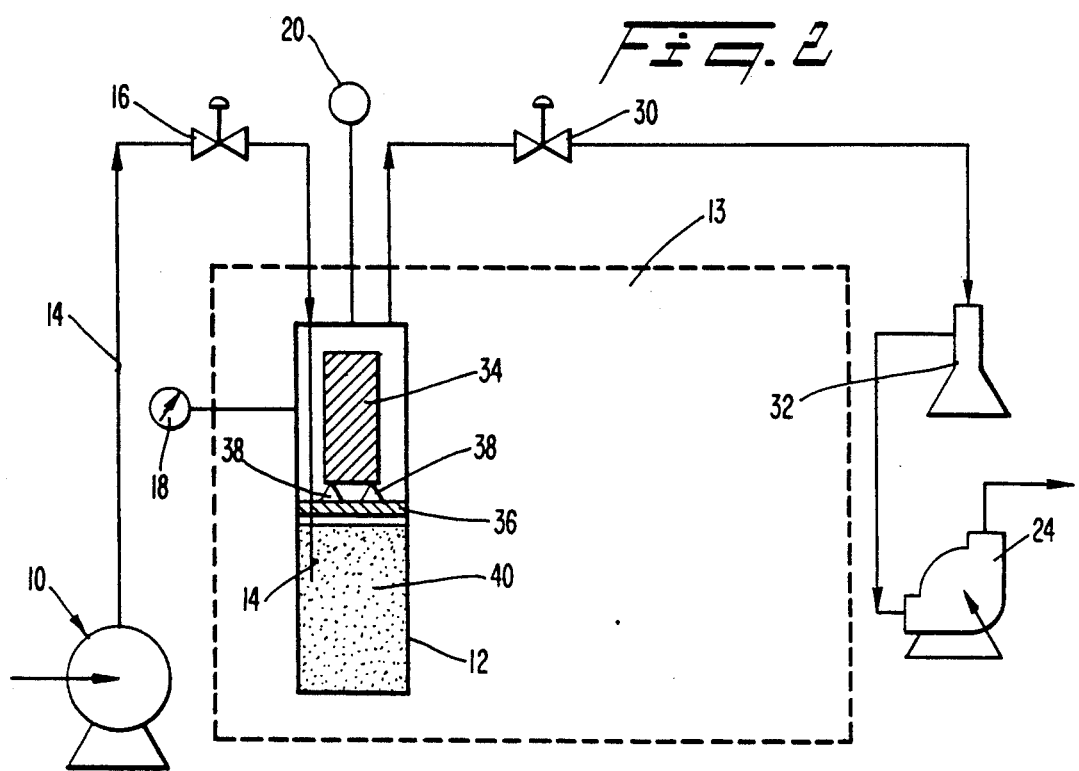
FIG. 2 is a schematic drawing of an apparatus employed in the impregnation of wood by a supercritical fluid/monomer/entrainer/catalyst solution.

FIG. 2 shows the apparatus of FIG. 1 in use for impregnating a supercritical fluid/monomer/entrainer/catalyst mixture into wood. The article of wood 34 being treated is supported in pressure tank 12 by a wire screen 36 and is held in spaced relation to the screen by pointed support members collectively designated 38 to distribute the supercritical fluid solution, thereby exposing as much surface of the wood as possible to the supercritical solvent. The monomer/entrainer/catalyst mixture 40 is solubilized in upflowing supercritical fluid which enters the mixture below its surface via line 14 as shown, thereby forming a supercritical fluid mixture. Upon the lapse of a predetermined period of time of continuous flow impregnation, tank 12 is depressurized to vent the supercritical solvent.

The weight gain of the wood is attributable primarily to the impregnated monomer which was in situ polymerized since collected extract amounts in collector 32 were negligible as more fully described below.

Experiments were conducted at 35 degrees centigrade for one hour of impregnation with different monomer and monomer mixtures using carbon dioxide as the supercritical fluid;

In a first experiment, conducted at 1200 psig, where the monomer was MMA, the initial weight of the wood before impregnation was 87.50 grams, and the final weight after impregnation was 112.0 grams, indicating penetration of the MMA into the wood structure.

In a second experiment conducted at 1200 psig, where the monomer was styrene, the initial weight before impregnation was 84.63 grams and the final weight after impregnation was 109.18 grams again indicating penetration of the monomer into the wood.

Additional experiments at 35 degrees centigrade were conducted at 1500 psig. In one experiment with MMA monomer, the initial weight before impregnation was 82.0 and the final weight after impregnation was 106.62 grams. In the second additional experiment, the initial weight was 105.8 grams and after impregnation the final weight was 125.7 grams. In the third additional experiment using MMA in 5% acetone with $CO_2$, the initial weight was 83.78 grams and after impregnation the final weight was 107.51 grams. Each of these experiments showed significant penetration of monomer into the wood.

A number of experiments to include polymerization of the monomer were also conducted using carbon dioxide as the supercritical fluid. In these experiments, pieces of MMA impregnated wood from the latter experiments above were cut after impregnation, and their final weight after impregnation and their final weight after polymerization of MMA were determined. In a first experiment the polymerization temperature was 52 degrees centigrade with an azo catalyst, the final weight after impregnation of the first piece of wood with MMA was 34.00 grams and its final weight after polymerization of the MMA was 31.08 grams. A second piece of wood treated at a polymerization temperature of 52 degrees centigrade with an azo catalyst had a final weight after impregnation of MMA of 27.72 grams and a final weight after polymerization of the MMA of 27.59 grams. A third piece of wood was treated at 42 degrees centigrade with an azo catalyst; its final weight after impregnation was 27.93 grams and its final weight after polymerization was 26.40 grams.

Another sample of previously MMA impregnated wood, treated at a polymerization temperature of 52 degrees centigrade with an azo catalyst, weighed 24.39 grams after impregnation with MMA and 21.44 grams after polymerization of the MMA. A second piece of MMA impregnated wood, which was treated at a polymerization temperature of 47 degrees centigrade, weighed 23.94 grams after impregnation and 22.66 grams after polymerization. A third piece of MMA impregnated wood, treated at a polymerization temperature of 42 degrees centigrade with azo catalyst, weighed 23.14 grams before polymerization and 21.98 grams after polymerization. Each of these experiments demonstrates the in situ polymerization of a monomer into wood.

Figure 3:
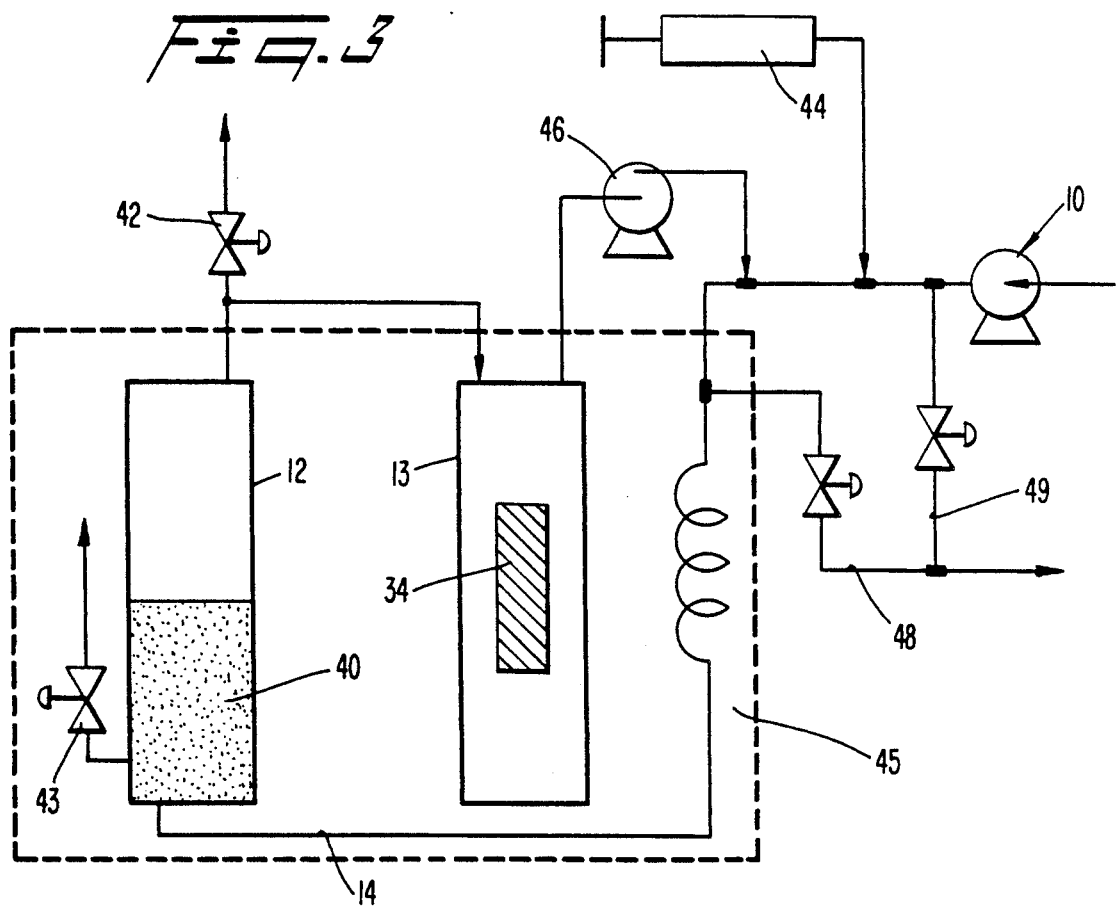
FIG. 3 is a schematic drawing of an alternative apparatus employed in the impregnation of wood.

Another suitable apparatus for carrying out the invention with continuous flow of supercritical fluid and monomer but batch flow for wood is shown in FIG. 3 which is an adaptation of FIG. 2. Separate pressure tanks 12, 13 surrounded by a constant temperature bath 45 are employed to contain a monomer, cosolvent or entrainer, and catalyst solution 40 and a block of wood 34 to be impregnated, respectively. A sample of solution for testing purposes may be withdrawn through valve 43.

As in the apparatus of FIG. 2, the supercritical fluid (e.g. $CO_2$) is introduced into tank 12 via line 14 from supply 10 to achieve an upflowing solvent.

A solubility sample is taken through valve 42; an optional pressure generator 44 that may be used for pressure compensation and control and a second pump means 46 for recirculation of $CO_2$ and monomers are connected to the system. Line 48 goes to vent with recycled $CO_2$ being in line 49. Heating element 50 controls the temperature of the water bath 45.

Numerous other apparatus can be employed to carry out the inventive steps.

Figure 4:
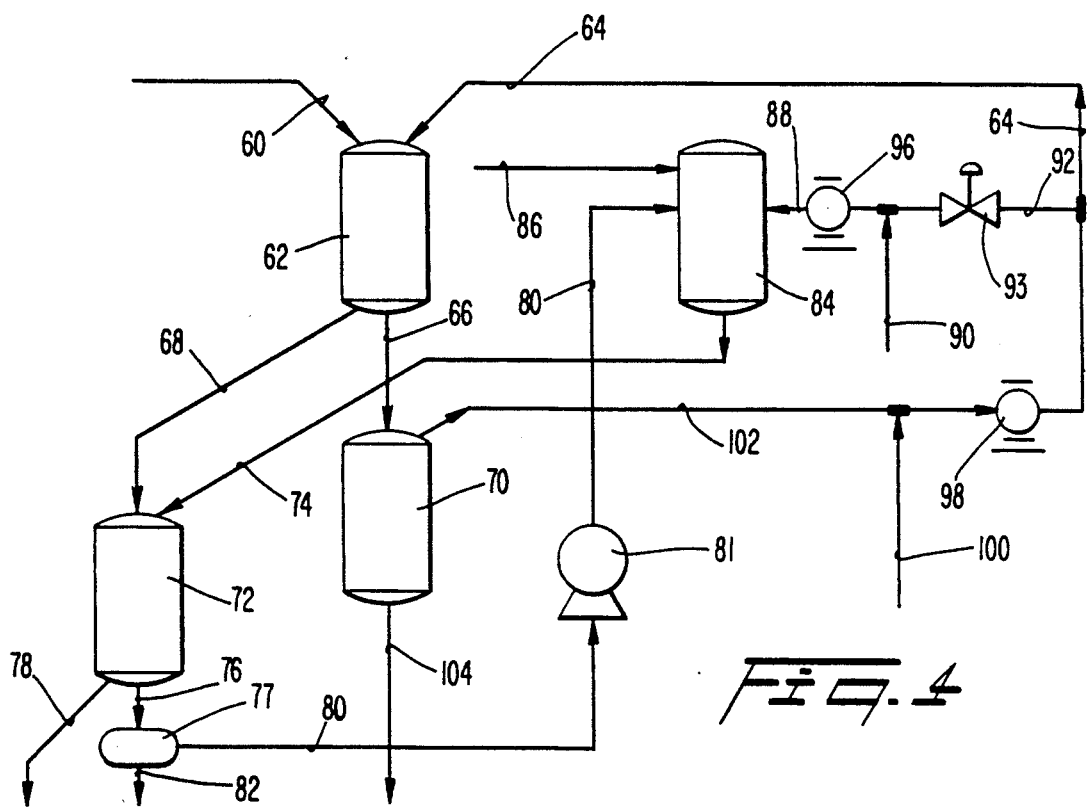
FIG. 4 is a schematic drawing of a process for the impregnation of wood using supercritical fluid techniques.

A schematic diagram of a process for performing one or more of the inventive processes is shown in FIG. 4. This scheme applies to cases where chips as opposed to large blocks or logs are impregnated. Typical post processing may result in fiberboards with superior properties.

Wood, which may be in the form of chips, is introduced through line 60 into extractor vessel 62. Vessel 62 may be operated in batch mode or continuous mode by means known to the art. A supercritical fluid, such as carbon dioxide, is introduced into vessel 62 through line 64. The wood is preconditioned by debarking, chipping, screening, and/or dewatering by well known means not shown. Typical chip lengths are about $\frac{1}{2}$" to 1". Practice of this invention routinely permits the use of chips having significantly longer lengths, e.g. 4" to 6", however.

Conditions in extractor 62 can vary considerably depending upon the type of wood being processed. However, in all events the temperature and pressure must be maintained above the critical point for the supercritical fluid mixture. For carbon dioxide, the temperature would therefore be 31.1° C., the critical temperature for $CO_2$ or higher, and a pressure from 1200 to 2400 psig. Under these conditions, extractives are removed from the wood by the solvent action of the carbon dioxide. A cosolvent or entrainer such as acetone may be simultaneously added to the vessel 62 by means not shown. Such cosolvent would be specific for the particular extractives and its use would increase the overall efficiency of the extractive step.

After a predetermined time which could range from one minute to 24 hours of contact time, the wood chips having less extractives are removed from extractor vessel 62 via line 68 and introduced into impregnator zone 72.

Make-up supercritical fluid is added to the system primarily through line 100 and compressor or pump means 98, and discharged through lines 94 and 64 into vessel 62 as aforesaid.

A portion of the supercritical fluid in line 94 is passed through line 92, control valve 93, compressor 96, and line 88 into mixer vessel 84. Alternatively, valve 93 may be closed and a second or different supercritical fluid, such as ethane, may be introduced via line 90, pump means 96, and line 88 into vessel 84. As a further alternative, a blend of supercritical fluids may be mixed from line 92 and 90 with the blend passing into vessel 84 from pump means 96 and line 88. Those skilled in the art can adjust such blending, if desired, by the objectives to be gained by the practice of one of the invention's processes.

Monomer is introduced into vessel 84 through line 86. Conditions in mixer 84 may be batch or continuous. Preferably, it would be continuous countercurrent mixing by techniques known to those skilled in the art. The supercritical fluid and monomer mixture are passed through line 74 into impregnation zone 72 wherein the mixture is contacted with the wood chips having less extractives being introduced from line 68.

The impregnation conditions maintained in the impregnation zone 72 may vary considerably but it is required that the temperature and pressure be maintained at or above the critical point of the supercritical fluid mixture. The selected conditions will be those compatible with the monomer selected and the supercritical fluid selected. Preferably, the temperature would be from 5° to 250° centigrade, typically from 25° C. to 65° C., and a pressure from 250 to 3500 pounds per square inch absolute. Time for impregnation may be from one minute to 24 hours. Processing is preferably batch by using a series of impregnators using a swing or cyclic system of valving as is well known to those skilled in the art and not shown.

The conditions in vessel 72 are also selected to cause impregnation and polymerization of the monomer in situ in the wood having less extractives. Impregnation and polymerization may be accomplished in a sequential operation or may be accomplished concurrently. Preferably, such polymerization is sequentially batch as aforesaid and may be accomplished using heat, radiation, catalysis, or some other form of energy. Supercritical fluid containing residual monomer is released from vessel 72 through line 76 into low pressure separator 77. Low pressure separator is maintained under relatively low pressure sufficient to flash the supercritical fluid from its waste products. Waste is removed from vessel 77 through line 77 and disposed of or used in an environmentally acceptable method as known by those having ordinary skill in the art. Released or flashed supercritical fluid may contain some residual monomer, if desired, and is transported via line 80 through pump means 81 into vessel 84 as recycle material. So that the process may be operated continuously, vessel 72 and separator 77 may comprise a series of vessels from 2 to 12 vessel configurations suitably valved, not shown, to operate continuously with the flow from lines 68 and 74 respectively.

Polymer impregnated wood chips are removed from vessel 72 through line 78. This wood polymeric network, bonded internally as well as with the cellulose substrate, forms a complex but stable two-phase composite. It has enhanced properties including, frequently, improved strength and stiffness. Compression properties usually undergo greatest improvement through such polymeric impregnation.

The bulk of the supercritical fluid containing extractives and lignin is removed from extractor 62 via line 66 into separator vessel 70. By reducing the pressure in vessel 70, the supercritical fluid is separated from the extractives and lignin which are removed through line 104. Recovered supercritical fluid having substantially less extractives is passed through line 102 to be admixed with make-up fluid entering the system through line 100. By the recirculation of supercritical fluid, significant economy of operation is introduced into the inventive process.

As a further alternate process according to the invention and referring again to FIG. 4, material comprising an alkaline medium or acid medium as described herein may be introduced into vessel 62 by means not shown. In such alternate scheme, vessel 62 is operated as a digester or pulper. The material in line 68 is wood pulp and the material in line 66 is the supercritical fluid together with either the unimpregnated alkaline medium or acid medium. Separator 70 is operated to recover the supercritical fluid through line 102 and the separated extractives and medium are removed through line 104.

The pulp in line 68 may be processed in vessel 72 as aforesaid. The pulp in line 68 may be alternatively directly processed into paper by known means not shown whereby the operation of vessel 72 and vessel 84 and their appurtenant piping and vessels are shut down. The pulp has enhanced properties by virtue of the more thorough impregnation of the medium which in turn enhances the separation of the chips into discrete fibers during the digestive process.

INDUSTRIAL APPLICABILITY

The forest products industry is in need of the present invention because it substantially shortens the amount of time required to form wood-composites. The acceleration of time required to form the wood-composite product does not diminish the quality of the final product, but actually enhances it because the monomers or monomer mixtures are able to penetrate the interstitial spaces in the wood due to the very low viscosity of the supercritical fluids, the low viscosities of the monomers, and the pore-swelling abilities of the entrainers.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A process of making a porous material having enhanced properties, which comprises:
   contacting porous material with a first supercritical solvent under conditions sufficient to extract extractives from said material;
   separating supercritical solvent containing extractives from the porous material having less extractives;
   contacting the porous material having less extractives with a second supercritical solvent containing a polymerizable monomer under conditions sufficient to impregnate the monomer into the porous material having less extractives;
   precipitating the polymerizable monomer within the porous material having less extractives; and
   polymerizing said precipitated polymerizable monomer in situ within the porous material having less extractives, thereby making a porous material having enhanced properties.

2. A process that enhances the chemical and mechanical properties of wood, which comprises:
   preparing a predetermined quantity of a monomer in fluid form and containing said monomer in a vessel;
   introducing a supercritical fluid into said vessel so that it flows through said monomer and dissolves said monomer, thereby forming a supercritical solvent; and
   subjecting an article of wood to said supercritical solvent for a predetermined period of time at a predetermined pressure and at a predetermined temperature; and recovering from the vessel wood having enhanced chemical and mechanical properties.

3. A process for treating wood to improve its physical qualities, which comprises:
   immersing the wood for a predetermined time in a supercritical solvent containing monomer;
   enlarging the pores of the wood by subjecting it to an entrainer dissolved in the supercritical fluid;
   promoting polymerization of the monomer by dissolving a catalyst in said supercritical solvent;
   inhibiting premature polymerization by including a polymerization inhibitor in the supercritical solvent; and
   facilitating the transporting of monomers from bulk into the cell walls of the wood by dissolving an additional solvent in said supercritical solvent; subjecting the immersed wood to conditions sufficient to polymerize the monomer within the cells of the wood, and separating the wood containing polymer from the supercritical fluid, thereby making a wood having improved physical properties.

4. A process for making paper which comprises impregnating wood with an alkaline medium or acid medium in the presence of a first fluid maintained under supercritical conditions, digesting the medium impregnated wood in the presence of a second fluid maintained under supercritical conditions including conditions sufficient to extract extractives and lignin from the wood and to separate the wood into essentially discrete fibers, separating supercritical fluid and extractives and lignin from the digested wood, and treating the separated digested wood under conditions including contacting the digested wood with a third supercritical fluid containing monomer, precipitating the monomer within the wood, and polymerizing the monomer in situ in the digested wood, and thereafter under conditions sufficient to convert the digested wood to paper.

5. A process for making a wood composite which comprises
   contacting wood with a fluid medium maintained in its supercritical state having a solute of polymerizable monomer;
   polymerizing the solute in situ under the supercritical state conditions;
   removing the fluid medium from the wood by separating the solute from the fluid medium by precipitating the solute from its supercritical state to a liquid or solid state into the wood material;
   thereby making a wood composite.

6. Process according to claim 5 whereby polymerizing the solute and separating the solute are simultaneous steps under isobaric conditions.

7. A process for making a wood composite which comprises;
   contacting wood with a fluid medium maintained in its supercritical state having a solute of polymerizable monomer;
   separating the solute from the fluid medium by precipitating the solute from its supercritical state to a liquid or solid state into the wood matrix; and,
   polymerizing the solute in situ;
   thereby making a wood composite.

* * * * *